United States Patent
Golparian

(10) Patent No.: US 8,014,677 B2
(45) Date of Patent: Sep. 6, 2011

(54) OPTICAL ACTIVATION OF ONE OR MORE COMMUNICATION UNITS IN A SURVEY SYSTEM

(75) Inventor: Daniel Golparian, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 654 days.

(21) Appl. No.: 12/164,517

(22) Filed: Jun. 30, 2008

(65) Prior Publication Data

US 2009/0324216 A1    Dec. 31, 2009

(51) Int. Cl.
*H04B 10/20*    (2006.01)
(52) U.S. Cl. .................... 398/109; 398/15; 367/134
(58) Field of Classification Search .......... 398/15, 398/106–109, 110, 113; 367/16, 131–134
See application file for complete search history.

(56) References Cited

U.S. PATENT DOCUMENTS

| | | | |
|---|---|---|---|
| 4,725,992 A | 2/1988 | McNatt | |
| 5,504,606 A * | 4/1996 | Frigo | ............................. 398/58 |
| 7,143,299 B1 * | 11/2006 | Rubinstein et al. | ........... 713/320 |
| 7,287,175 B2 | 10/2007 | Vereen et al. | |
| 7,298,671 B2 | 11/2007 | Brinkmann et al. | |
| 7,729,202 B2 | 6/2010 | Eperjesi | |
| 7,768,931 B2 * | 8/2010 | Golparian | ..................... 370/252 |
| 7,835,221 B2 * | 11/2010 | Vigen et al. | ..................... 367/19 |
| 2005/0246137 A1 | 11/2005 | Brinkman et al. | |
| 2006/0155758 A1 * | 7/2006 | Arnegaard et al. | ....... 707/103 X |
| 2007/0253289 A1 | 11/2007 | Chamberlain et al. | |
| 2007/0268114 A1 | 11/2007 | Enenkl | |
| 2008/0136603 A1 | 6/2008 | Choi | |
| 2010/0097884 A1 | 4/2010 | Golparian | |

FOREIGN PATENT DOCUMENTS

WO    2004049006 A1    6/2004

OTHER PUBLICATIONS

PCT Search Report, dated Jan. 18, 2010, Application No. PCT/US2009/047148.

* cited by examiner

*Primary Examiner* — Leslie Pascal

(57) ABSTRACT

To control activation of one or more communication units in a survey system that performs surveying of a subterranean structure, optical activity on at least one optical link connected to at least one communication unit that is part of a survey system is detected. In response to determining that the optical activity has a characteristic that satisfies a predetermined criterion, the at least one communication unit is awakened.

22 Claims, 5 Drawing Sheets

OPTICAL ACTIVATION OF ONE OR MORE COMMUNICATION UNITS IN A SURVEY SYSTEM

TECHNICAL FIELD

The invention relates generally to optical activation/deactivation of one or more communication units in a survey system that performs surveying of a subterranean structure.

BACKGROUND

Surveying is used for identifying subterranean elements, such as hydrocarbon reservoirs, freshwater aquifers, gas injection reservoirs, and so forth. Surveying can include seismic surveying or electromagnetic (EM) surveying. In seismic surveying, seismic sources are placed in various locations above an earth surface or sea floor, with the seismic sources activated to generate seismic waves directed into the subterranean structure.

The seismic waves generated by a seismic source travel into the subterranean structure, with a portion of the seismic waves reflected back to the surface for receipt by seismic receivers (e.g., geophones, hydrophones, etc.). These seismic receivers produce signals that represent detected seismic waves. Signals from seismic receivers are processed to yield information about the content and characteristic of the subterranean structure.

EM surveying involves deployment of one or more EM sources that produce EM waves that are propagated into the subterranean structure. EM signals are affected by elements in the subterranean structure, and the affected EM signals are detected by EM receivers, which are then processed to yield information about the content and characteristic of the subterranean structure.

In addition to survey sources and survey receivers, a survey system can also include concentrator units to enable communication among different components of a survey system. A network interconnecting different elements of the survey system can be implemented completely or partially with fiber optic links. In most cases, the concentrator units can be interconnected by fiber optic links. Conventionally, to awaken (initially power up) components of a survey system, special wakeup commands or messages are sent by a controller to various components in the survey system, including the concentrator units. Each component that is awakened by such special messages has to analyze the content of the messages to determine whether or not the particular component should wake up. However, such conventional techniques for waking up components of a survey system are not very efficient.

SUMMARY

In general, according to an embodiment, a method of controlling activation of one or more communication units in a survey system that performs surveying of a subterranean structure includes detecting optical activity on an optical link connected to a communication unit. In response to determining that the optical activity has a characteristic that satisfies a predetermined criterion, the communication unit is awakened.

Moreover, in some embodiments, in response to determining that there has been lack of optical activity for the predetermined time duration, placing the at least one communication unit into a low-power mode.

Other or alternative features will become apparent from the following description, from the drawings, and from the claims.

DETAILED DESCRIPTION

Figure 1:
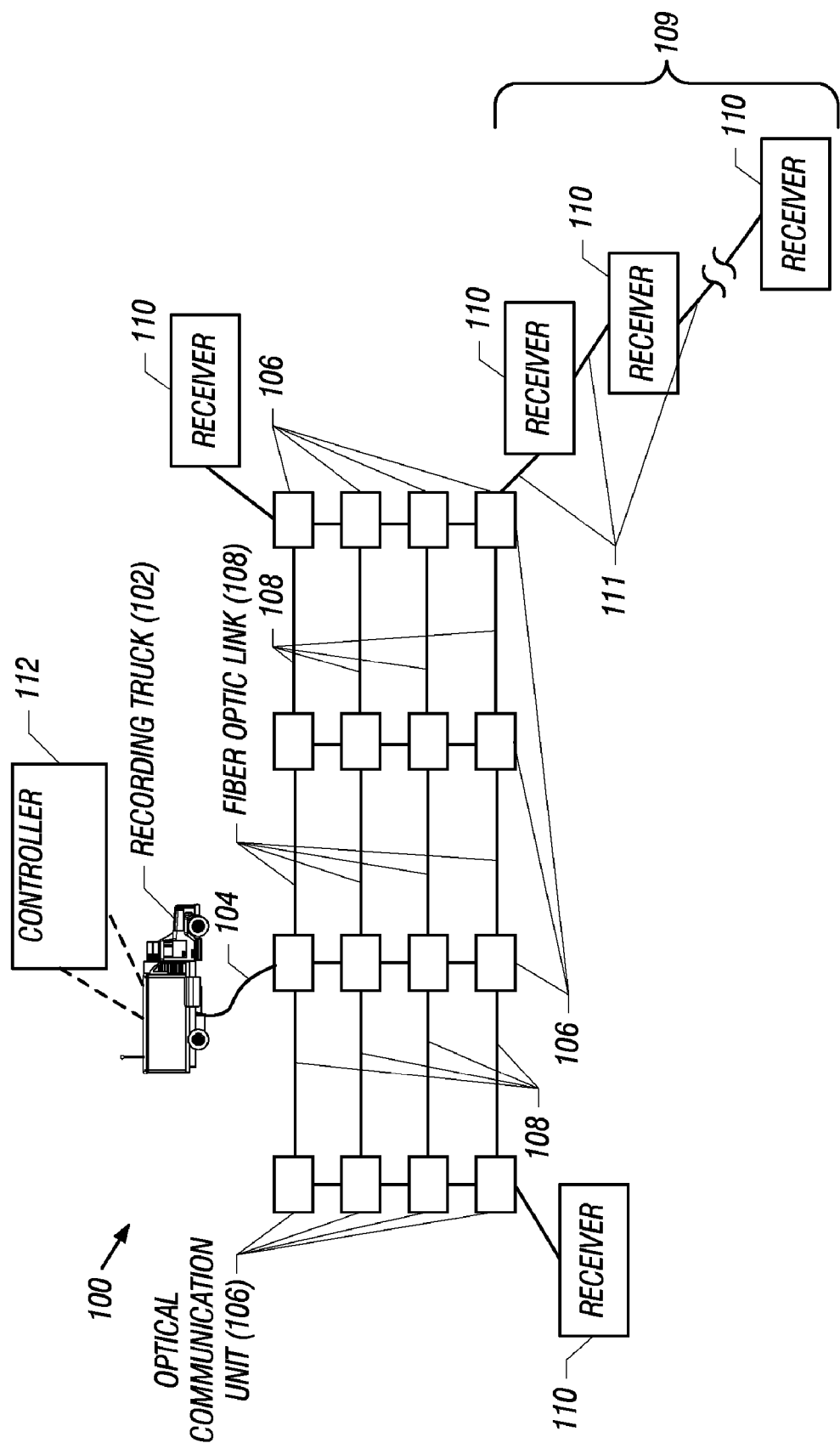
FIG. 1 is a block diagram of an example survey system that includes communication units and survey units, in accordance with some embodiments.

In the following description, numerous details are set forth to provide an understanding of the present invention. However, it will be understood by those skilled in the art that the present invention may be practiced without these details and that numerous variations or modifications from the described embodiments are possible.

In general, according to some embodiments, a survey system includes a central recording system (which resides in a recording truck for a land-based survey application and resides in a marine vessel in a marine-based survey application) that is coupled over a network of concentrator units to survey receivers (and possibly survey sources). A concentrator unit includes circuitry to perform routing of data. The central recording system is able to receive and store data measured by survey receivers. Also, the central recording system is able to perform management tasks by sending commands over the network of concentrator units. In accordance with some embodiments, the management tasks include awakening or deactivating components of the network based on optical activity in fiber optic links that are part of the network (or based on a combination of such optical activity and other communications, such as wired and/or wireless communications).

In one example, "optical activity" refers to presence of a carrier signal over an optical link for some predetermined period of time, which can be generated by optical transmitters, including the optical transmitter(s) of the central recording system, when the optical transmitters power up.

Also, in some embodiments, the survey system (or some segment or segments of the survey system) can be placed into a low-power mode due to lack of optical activity to achieve power savings. Achieving power savings is useful if components of the survey system are powered by batteries.

In the ensuing discussion, a "communication unit" refers to a component in the survey system that is able to communicate messages or commands with another component. In some examples, a communication unit can refer to a concentrator unit to enable dynamic routing of messages across the survey system. Note that there can be several different types of concentrator units (e.g., end concentrator units connected to survey receivers, and intermediate concentrator units connected to other concentrator units). In a large survey system, there can be a relatively large number of intermediate concentrator units.

A "communication unit" can also refer to a survey receiver or survey source that includes communication elements that allow the survey source or survey receiver to communicate messages or commands with another component of the survey system. Thus, generally, a "communication unit" refers to any component of the survey system that is able to communicate with another component. More specifically, in accordance to some embodiments, a "communication unit" refers to any component that is able to communicate optically with another component.

FIG. 1 shows an example arrangement of a survey system 100 that has a recording truck 102 (or some other type of central control system) that is connected by a fiber optic link 104 to at least one of multiple communication units 106. The multiple communication units 106 are interconnected by fiber optic links 108 (which together make up an optical network). Although the recording truck 102 is shown as being connected to just one of the communication units 106, it is noted that the recording truck 102 can actually be connected to several communication units 106. In other implementations, other topologies can be used. Also, the recording truck 102 can be replaced with a marine vessel for a marine survey application.

Some of the intermediate concentrator units can be connected to survey receivers, such as survey receivers 110 depicted in FIG. 1. A survey receiver includes elements for detecting survey signals induced by survey sources. In one example, survey sources and survey receivers can be seismic sources and seismic receivers, respectively. Examples of seismic sources include air guns, vibrators, explosives, and so forth. Examples of survey receivers include geophones, hydrophones, accelerometers, and so forth. In another example, survey sources and survey receivers can include electromagnetic (EM) sources and receivers, respectively. EM receivers are able to detect electric and/or magnetic fields induced by EM sources.

As depicted in FIG. 1, a collection (or string) 109 of receivers 110 can be connected by a cable 111, which can be an electrical cable (to communicate power, data, and control signaling). Alternatively, communication can be performed wirelessly or by a fiber optic link between the receivers 110. As noted above, some embodiments of the invention awaken components of the network based on detected optical activity over fiber optic links. Once awakening based on detected optical activity is performed, the rest of the system which can be connected by electrical cables or connected wirelessly, can be awakened using other mechanisms.

Although not depicted in FIG. 1, note that in some applications, a survey source can also be connected to a central recording system over a network of concentrator units 106.

The recording truck 102 includes a controller 112 that is able to send messages over the optical link 104 to one of the communication units (or to plural communication units) in the survey system 100. The controller 112 is also able to receive data or messages from components in the survey system 100.

In some implementations, the survey system 100 is part of a land-based survey arrangement. Alternatively, the survey system 100 can be a part of a marine survey arrangement, in which case the recording truck 102 is replaced with a marine vessel.

In accordance with some embodiments, each communication unit in the survey system 100 is able to detect optical activity caused by the controller 112 in an optical link 108 connected to the communication unit. The communication unit is able to determine whether the optical activity has a characteristic that satisfies a predetermined criterion. If so, the communication unit can be awakened (transitioned from a low-power mode to an active mode). Determining whether the optical activity has a characteristic that satisfies a predetermined criterion includes determining whether a carrier signal communicated by an optical transmitter has a duration that is longer than some threshold time duration. Detection of such optical activity can be performed by available optical transceivers, such as commercial off-the-shelf optical transceivers. Such optical transceivers include optical receivers that can detect a carrier signal and in response to such detection, activate a signal detection (SD) signal to indicate presence of the carrier signal for longer than the threshold time duration.

A low-power mode of a communication unit refers to a state in which at least some portions (e.g., a majority of the portions) of the communication unit are powered down. An active mode of a communication unit refers to a state in which the communication unit is able to process and respond to messages on the optical links.

In some implementations, the survey receivers 110 can be connected by electrically conductive links (e.g., copper cables) to a concentrator unit 106. The electrically conductive links allow the survey receivers 110 to be powered by the concentrator units 106. For example, the concentrator units 106 can be powered by batteries (or other power sources), and such power can then be delivered to the receivers 110 via the electrically conductive links. Alternatively, the links between the survey receivers 110 and the concentrator units 106 can include optical links, or wireless links.

Determining whether or not to awaken a communication unit based on detecting that the optical activity has a characteristic that satisfies a predetermined criterion allows the wakeup procedure to be performed without requiring that the communication unit processes or analyzes the content of any message that can be associated with the optical activity. Not having to process or analyze content of any message associated with the optical activity allows for a more efficient wakeup procedure. To process or analyze content of a message, a main processing core of the communication unit would have to be powered, which is relatively wasteful of power resources. Also, the routing circuitry of a communication unit would also have to be powered on to route the message. Also, having to process or analyze message content would require more processing time, which when cumulated in a network having a large number (e.g., hundreds of thousands) of communication units could be quite large. Moreover, failure of a main processing core in any one communication unit may result in failure in awakening communication units in the remainder of the chain. By determining whether the communication unit is to be awakened based on detecting optical activity that has a characteristic that satisfies a predetermined criterion, the main processing core of the communication unit can remain powered off (or remain in a low-power state), which achieves better power savings for the survey system 100, particularly if the survey system 100 has a relatively large number (e.g., hundreds or thousands) of communication units.

In accordance with some embodiments, each communication unit has a low-power mode, in which the main processing core of the communication unit is powered off or placed in a low-power state (e.g., standby state, sleep state, etc.). However, a small part of the communication unit, referred to as an optical activity detector, can remain powered to detect optical activity on an optical link to allow the communication unit to be awakened in response to determining that the optical activity has a characteristic that satisfies a predetermined criterion. Once awakened, the communication unit has exited the low-power mode and is in the active mode (where the main processing core is powered on). Note that when all of the communication units of the survey system are in this low-power mode, only a very small part of the system would be powered, so that substantial power savings can be achieved.

Figure 2:
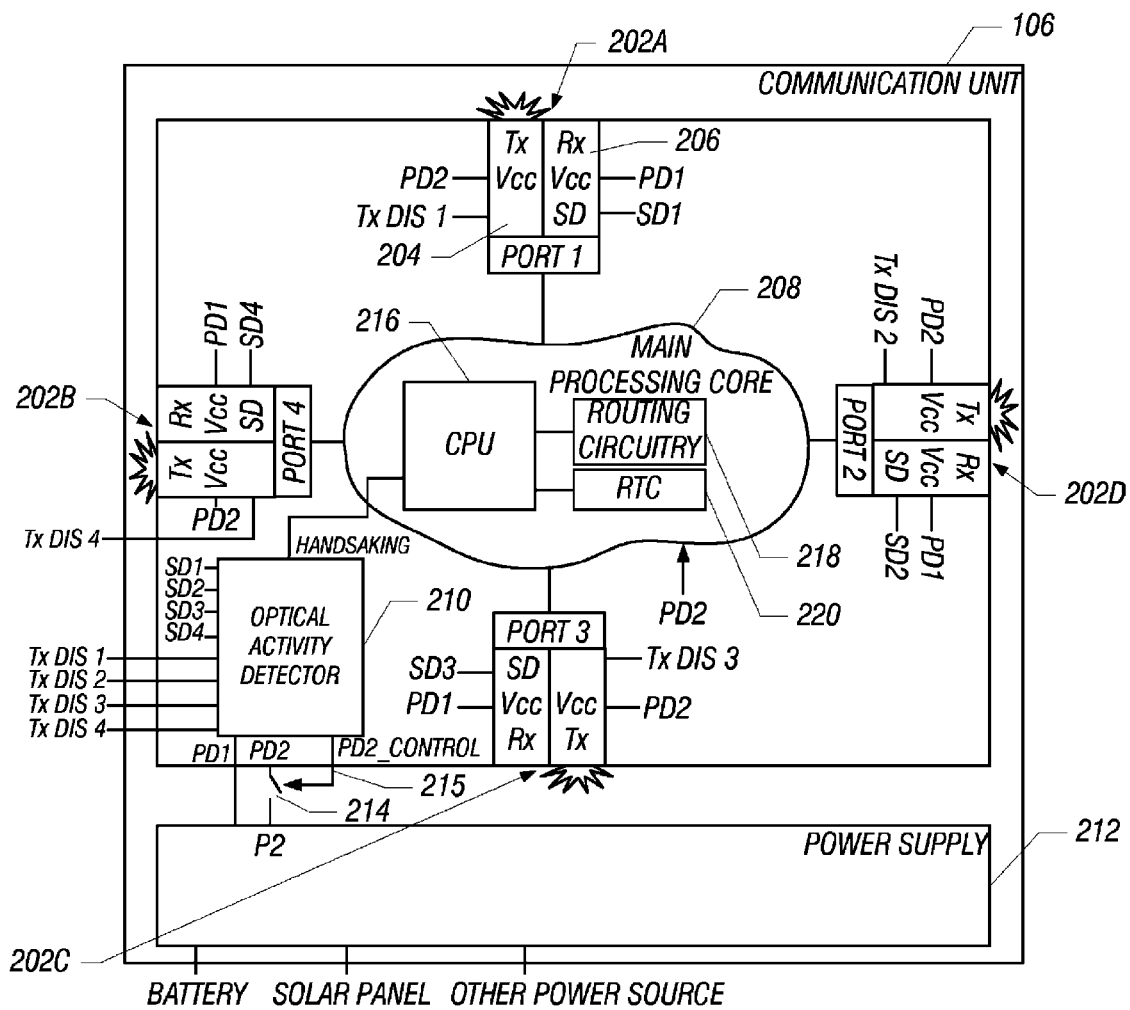
FIG. 2 is a block diagram of a communication unit, according to an embodiment.

FIG. 2 is a block diagram of an example communication unit 106 according to an embodiment. Note that a survey receiver or a survey source can also have similar components if the survey receiver or survey source is configured to communicate optically over an optical link.

In the example of FIG. 2, the communication unit has multiple optical transceivers 202A, 202B, 202C, and 202D. Each transceiver 202 (202A, 202B, 202C, or 202D) includes an optical transmitter 204 and an optical receiver 206. The transceiver 204 transmits optical signals over an optical link, and the receiver 206 receives an optical signal transmitted over the optical link. Receipt of an optical signal is indicated by a signal detection (SD) signal (SD1-SD4 in FIG. 2). The SD signal is asserted by the receiver 206 in response to detecting an optical signal by the receiver 206. The optical activity referred to above that is used to awaken a communication unit can be in the form of an SD signal, in some embodiments. In the example of FIG. 2, the four optical transceivers 202A-202D are connected to four corresponding optical links. In different implementations, different numbers of optical transceivers can be provided in the communication unit 106, such as less than four or greater than four. In many commercial off-the-shelf optical transceivers, the SD signal is available as an output signal which can be used in some embodiments of the invention.

The communication unit 106 has a main processing core 208, and an optical activity detector 210. The optical activity detector 210 can be implemented with a programmable device, such as a complex programmable logic device (CPLD). Alternatively, the optical activity detector 210 can be implemented with other types of control devices.

The communication unit 106 also includes a power supply 212 that is able to receive power from one or more power sources, such as a battery, solar panel, or other power source. The power supply 212 outputs at least two power supply voltages, which in the example of FIG. 2 are PD1 and P2. The power supply voltage PD1 is connected to the optical activity detector 210, as well as to the VCC input (power supply voltage input) of receivers 206 in the transceivers 202A-202D.

The power supply output P2 from the power supply 212 is connected to one side of a power switch 214, which when opened isolates the power supply output P2 from a power supply voltage PD2. In other words, if the power switch 214 is open, the power supply voltage PD2 is off. However, when the power switch 214 is closed, under control of a control signal 215 from the optical activity detector 210, the PD2 power supply voltage is connected to the power supply output P2, such that PD2 is driven to the voltage level of P2.

The power supply voltage PD2 is connected to the VCC inputs of the transmitters 204 of the transceivers 202A-202D. The power supply voltage PD2 is also connected to the main processing core 208 as well as to the rest of the communication unit (other than the circuitry powered by PD1). Thus, while the power switch 214 is open, the optical transmitters 204 and the main processing core 208 are powered off.

The main power switch 214 being open corresponds to the low-power mode of the communication unit 106, since most of the components of the communication unit 106 are powered off. In the low-power mode, the optical receivers 206 and optical activity detector 210 remain powered on by PD1 to enable receipt and detection of optical activity on at least one of the optical links connected to the communication unit. However, once the power switch 214 is closed, then power is provided to the main processing core 208 as well as to the optical transmitters 204 (and remainder of the communication unit), which corresponds to the active mode of the communication unit 106.

The main processing core 208 is connected to the transceivers 202A-202D, as well as to the optical activity detector 212. The main processing core 208 includes a central processing unit (CPU) 216, which can be implemented with a microprocessor, microcontroller, and so forth. The main processing core 208 also includes routing circuitry 218 for routing packets to other communication units. The main processing core 208 can also include other components, such as a real-time clock (RTC) 220. As will be described further below, the RTC 220 in each communication unit 106 is used to allow for deactivation (power down) of communication units.

Effectively, two power domains are present in the communication unit 106: a first power domain that is powered by power supply voltage PD1, and a second power domain that is powered by power supply voltage PD2. The first power domain includes the optical receivers 206 of the transceivers 202A-202D, and the optical activity detector 210. The second power domain includes the main processing core 208 and the optical transmitters 204 of the transceivers 202A-202D. Note that other components (not shown) can also be part of the first or second power domain.

Figure 3:
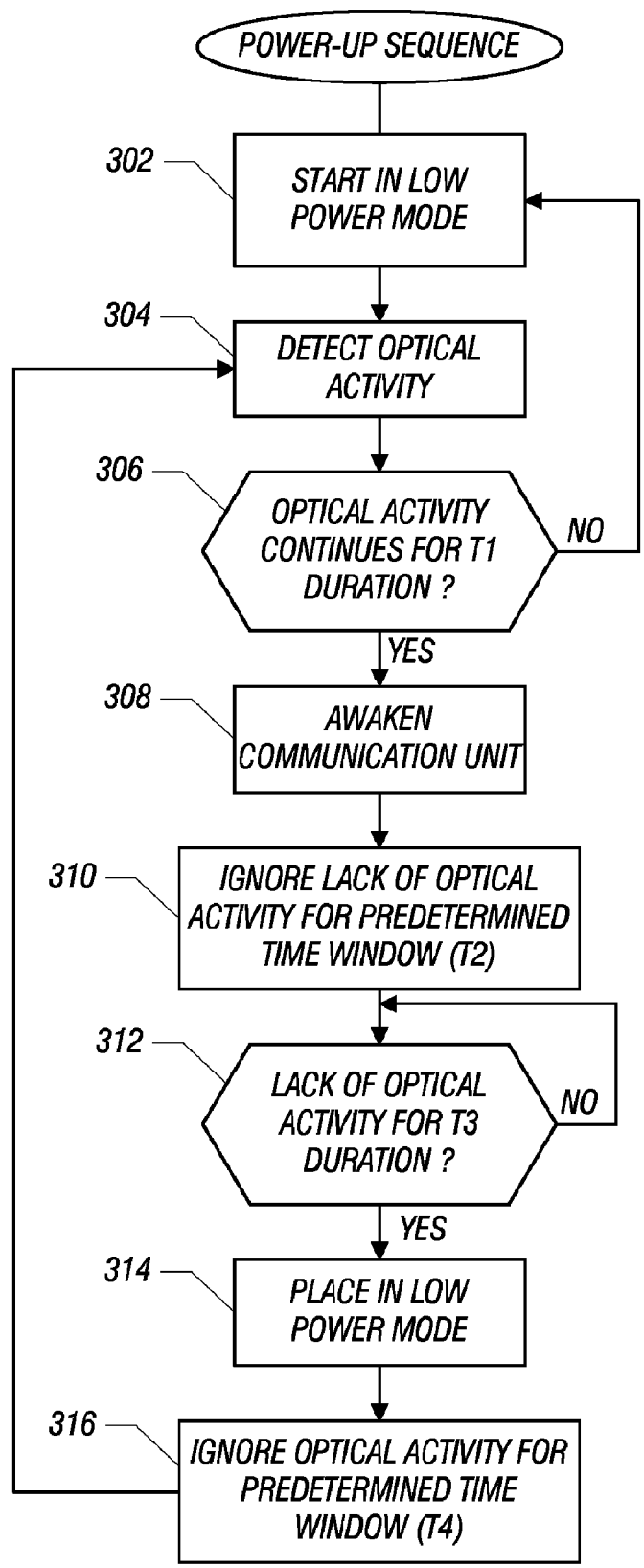
FIG. 3 is a flow diagram of a process of awakening a communication unit, according to an embodiment.

FIG. 3 shows an example power-up sequence of the communication unit 106. When the communication unit initially receives power from a power source, such as a battery, solar panel, or other power source, the communication unit starts (at 302) in the low-power mode. Effectively, the power switch 214 starts up in the open state to isolate PD2 from the output P2 of the power supply 212. However, PD1 is active.

The optical activity detector 210 then detects (at 304) optical activity (based on the SD signal, for example) on an optical link connected to one of the transceivers 202A-202D of the communication unit. The optical activity detector 210 then determines (at 306) whether the optical activity continues for at least a time duration T1. If the optical activity does not continue for at least the T1 duration, the communication unit stays in the low-power mode. However, if the optical activity continues for at least a T1 duration, then the optical activity detector 210 awakens (at 308) the communication unit by closing the power switch 214 to allow the power supply voltage PD2 to be activated. This supplies power to the main processing core 208 as well as to the optical transmitters 204 (and other components) of the communication unit 106. Activating PD2 would be much faster than powering up the main processing core (and having this main processing core analyze a wake-up message and route the message).

Once the optical transmitters 204 are activated, optical activity will be present on the outputs of the optical transmitters. Allowing optical activity to flow downstream, in a domino effect fashion, to other communication units allows such other communication units to also power up in accordance with some embodiments, since the optical activity is detected by corresponding optical activity detectors in the other communication units.

After a communication unit has been awakened, the communication unit will ignore (at 310) lack of optical activity for some predetermined time window (of T2 duration) after awakening of the communication unit. This is to avoid having communication units going back to the low-power mode when the survey system is still in the process of waking up or when some optical links are disconnected for replacement.

After the predetermined time window has passed, the communication unit determines (at 312) whether there has been a lack of optical activity for time duration T3. If not, communication unit 106 remains in the active mode. However, if lack of optical activity persists for at least the T3 duration, the communication unit is placed (at 314) in low-power mode by opening the power switch 214. Right after the communication unit 106 has been placed into low-power mode, optical activity is ignored (at 316) for some predetermined time window (T4) after placement of the communication unit into low-power mode. As explained further below in connection with the sleep mechanism, ignoring optical activity for duration T4 is to give neighboring communication units sufficient time to switch off their transceivers.

Control then proceeds back to task 304, in which the optical activity detector 210 waits for subsequent optical activity to continue for more than the T1 duration to again awaken the communication unit.

It is desirable to place the survey system in the lower-power mode when it is desired to achieve power savings in the system. Also, it may be desirable to place just a segment of the survey system into low-power mode, where such segment is not expected to be used. Placing the survey system (or some of its segments) into low-power mode is valuable if the communication units are powered using batteries, which have limited life.

In some simple network topologies, by stopping the optical activity from the controller 112 in the recording truck 102, all communication units will eventually enter the low-power mode.

However, in most scenarios, the survey system 100 may include closed loops in the optical network (as depicted in FIG. 1). These closed loops can cause certain communication units of the survey system 100 to remain in active mode even though the recording truck 102 has stopped the optical activity.

To address this issue, an additional mechanism can be provided for powering down the whole survey system or just a part of the survey system. This additional mechanism is referred to as a "time-based shutdown mechanism" or "sleep mechanism."

The controller 112 is able to selectively address (such as by using unique addresses or other identifiers associated with corresponding communication units) the communication units in the survey system 100. Whenever the survey system 100 is to be powered down, the controller 112 in the recording truck 102 can issue a shutdown command that is sent to all communication units in the system. The shutdown command will include an absolute time value indicating the exact time at which the communication units are supposed to enter the low-power mode. Note that each communication unit has a real-time clock 220 (FIG. 2) that can be synchronized with each other (within a given precision), such that the communication units are able to perform some action simultaneously (or substantially simultaneously). Synchronization of the real-time clocks 220 can be accomplished using global positioning system (GPS) receivers or by using synchronization protocols (commercially available or custom).

The absolute time specified in the shutdown command at which the communication units 106 are to be shut down should be late enough to allow all communication units to receive the command (to avoid some parts of the system going to low-power mode before the command is received by all communication units in the survey system 100).

Alternatively, the time-based shutdown mechanism can be used to selectively shut down just a single communication unit or some subset of communication units (that is less than all the communication units in the survey system 100). Shutting down a subset (or subsets) of the survey system is valuable to save power, particularly in a survey system that has a large number of communication units and in applications where communication units are powered by batteries, during times when just parts of the survey system are being used. When a subset (one or plural) of communication units is being powered down, an additional command referred to as a turnoff transceiver command is also sent to immediate neighbors of the selected communication unit(s) that is (are) being powered down. Such neighbors are referred to as "selected neighbors." To perform such task, it is important to be able to uniquely identify the selected neighbors and to ask them to turn off one or several of their optical transmitters. To enable the time-based shutdown mechanism, the controller 112 in the recording truck 102 is able to build a topology map of the survey system 100. Building the topology map is based on the controller 112 and communication units 106 running various commercially available or custom protocols in the network. The topology map shows interconnection of units, which is useful for identifying immediate neighbors of a communication unit or group of communication units that are to be put to sleep.

The turnoff transceiver command also includes an absolute time for execution. The turnoff transceiver command sent to the selected neighbor causes the selected neighbor to shut off its optical transmitter that is directly connected to the communication unit that is going to be placed in low power mode. Shutting off the optical transmitter in a neighbor communication unit is accomplished by causing activation of a TX Disable signal (TX DIS 1 to TX DIS 4 shown in FIG. 2) provided by the optical activity detector 210 to the corresponding optical transmitter. When one of the TX DIS 1 to TX DIS 4 signals is asserted by the optical activity detector 210 in response to the turnoff transceiver command, a carrier will not be generated by the corresponding optical transmitter even when the power to the optical transmitter is on. The turnoff transceiver command can be sent directly (from the controller 112 in the recording truck 102) to the selected neighbors of each selected communication unit to be placed into low-power mode, based on the topology map maintained by the controller 112. Alternatively, a particular communication unit receiving the shutdown command can be triggered to broadcast a turnoff transmitter command to its immediate neighbors. The immediate neighbors will be able to determine at which port the turnoff transmitter command was received, and thus will then turn off the optical transmitter at that port.

Figure 4:
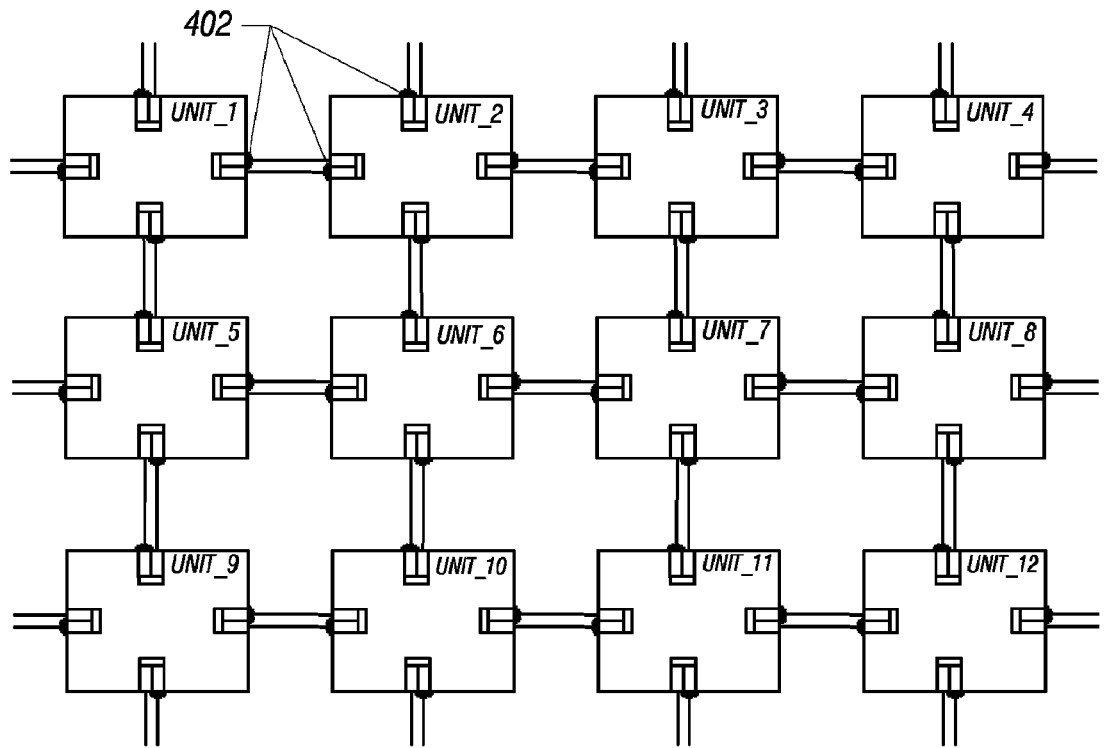
FIGS. 4-6 show an example of selectively powering down certain communication units.
Figure 5:
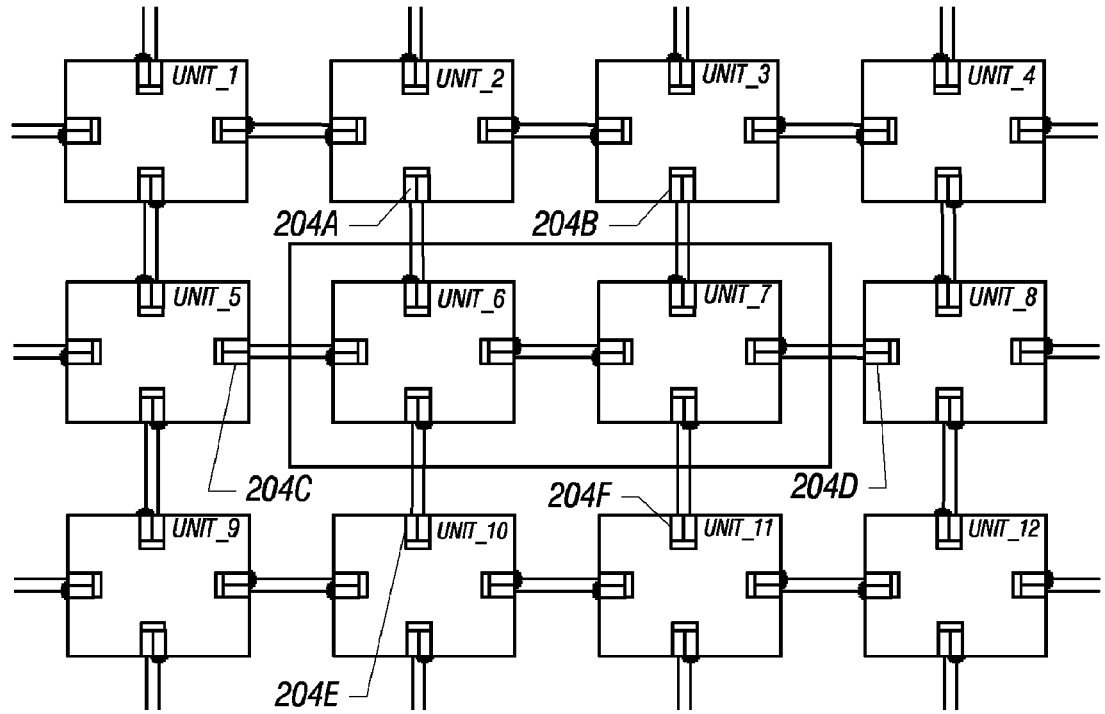
Figure 6:
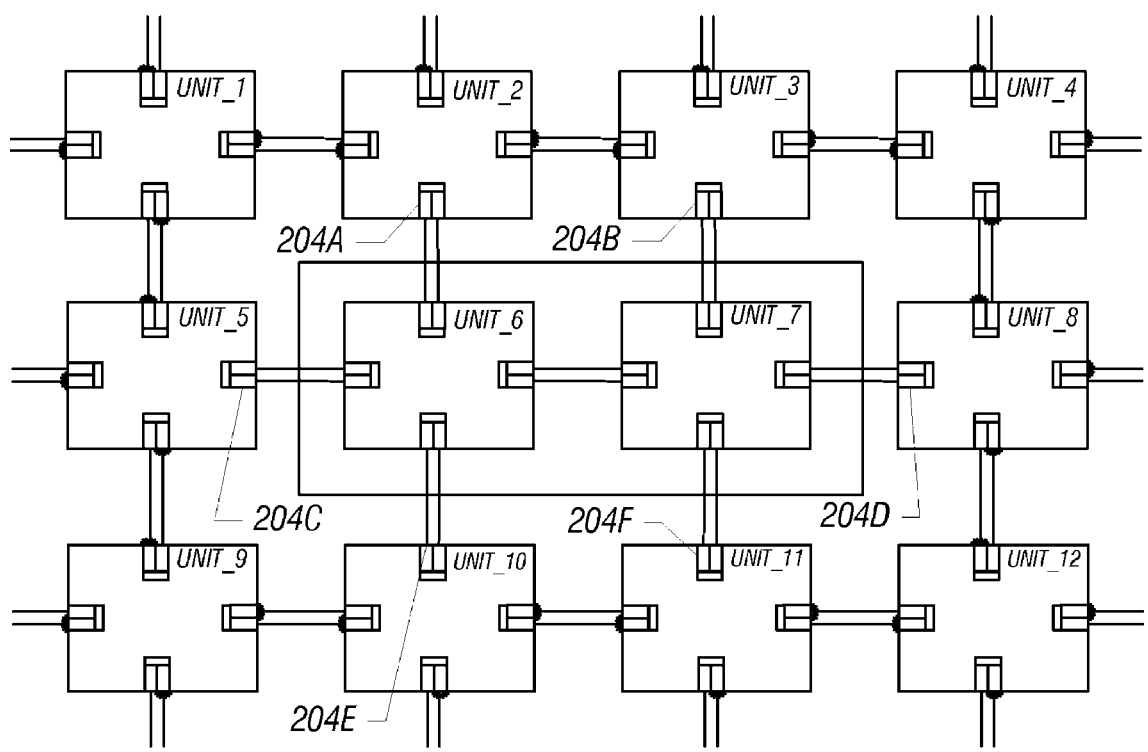

FIGS. 4-6 illustrate the concept of selective deactivation of communication units. Although these figures show a specific interconnection, the concept can be applied to many different topologies and interconnections. In the example, it is assumed that a shutdown command has been sent to communication units 6 and 7 (unit 6 and unit 7) to place these communication units into low-power mode, as shown in FIG. 5. In the state depicted in FIG. 4, all communication units (and their respective optical transmitters) remain powered. An optical transmitter that is powered on is indicated by a "flash" symbol, such as "flash" symbol 402. Turnoff transceiver commands will be also issued to immediate neighbors of communication units 6 and 7 (FIG. 5). The immediate neighbors include communication units 2, 3, 5, 8, 10, and 11. The turnoff transceiver command sent to the immediate neighbors causes optical transmitters 204A, 204B, 204C, 204D, 204E, and 204F in the immediate neighbors to be powered off in the corresponding neighbor communication units. Powering off of the optical transmitters of the immediate neighbors is depicted in FIG. 5, where "flash" symbols of the optical transmitters of the immediate neighbors are removed.

In FIG. 6, after execution of the shutdown command at communication units 6 and 7, such communication units enter sleep mode and have shut off all their transmitters, as depicted by removal of the "flash" symbols in FIG. 6.

Note that the absolute time for execution of the shutdown command is later than the absolute time for execution of the turnoff transceiver command executed by the neighboring communication units. In other words, the turnoff transceiver command is executed first by the neighboring communication units before communication units 6 and 7 execute the shutdown command. Otherwise, the optical activity from the immediate neighbors may awaken communication units 6 and 7 again.

If the entire survey system is shut down, then the survey system can later be awakened by starting the optical activity from the central recording system. However, if just a segment (or segments) of the survey system are shut down, then a different command, e.g., turnon transceiver command, can be sent to selected neighbors to turn on the neighbors. This command will cause the selected neighbors to deassert the TX DIS signals of their transmitters that connect them to the sleeping section of the survey system, and will consequently wake up their neighbors.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of controlling activation of one or more communication units in a survey system that performs surveying of a subterranean structure, comprising:
   detecting optical activity on at least one optical link connected to at least one communication unit that is part of the survey system for performing surveying of the subterranean structure;
   determining whether the optical activity has a characteristic that satisfies a predetermined criterion, wherein determining that the optical activity has the characteristic that satisfies the predetermined criterion is performed without processing content of any message associated with the optical activity; and
   in response to determining that the optical activity has the characteristic that satisfies the predetermined criterion, waking up the at least one communication unit.

2. The method of claim 1, wherein determining that the optical activity has the characteristic that satisfies the predetermined criterion comprises determining that the optical activity has a duration of at least a predetermined time duration.

3. The method of claim 1, wherein determining that the optical activity has the characteristic that satisfies the predetermined criterion comprises determining that a carrier signal has a duration of at least a predetermined time duration.

4. The method of claim 1, further comprising:
   after waking up the at least one communication unit, determining whether there is lack of optical activity for some predetermined time duration; and
   in response to determining that there has been lack of optical activity for the predetermined time duration, placing the at least one communication unit into a low-power mode.

5. The method of claim 1, further comprising:
   receiving a command to place the at least one communication unit into a low-power mode; and
   in response to receiving the command, placing the at least one communication unit into the low-power mode.

6. The method of claim 1, wherein waking up the at least one communication unit comprises waking up a concentrator unit.

7. The method of claim 1, wherein the at least one communication unit has multiple power domains, and wherein the at least one communication unit has a low-power mode in which a first of the power domains is powered, and the at least one communication unit has an active mode in which the multiple power domains are all powered,
   wherein waking up the at least one communication unit causes the communication unit to transition from the low-power mode in which the first power domain is powered to the active mode in which all of the multiple power domains are powered.

8. The method of claim 7, wherein transitioning to the active mode causes a main processing core of the at least one communication unit to transition from a powered-off state to a powered-on state.

9. The method of claim 1, wherein the survey system includes plural communication units and survey units, the method further comprising propagating messages through at least some of the communication units to the survey units.

10. A method of controlling activation of one or more communication units in a survey system that performs surveying of a subterranean structure, comprising:
    detecting optical activity on at least one optical link connected to at least one communication unit that is part of the survey system for performing surveying of the subterranean structure;
    determining whether the optical activity has a characteristic that satisfies a predetermined criterion;
    in response to determining that the optical activity has the characteristic that satisfies the predetermined criterion, waking up the at least one communication unit;
    after waking up the at least one communication unit, determining whether there is lack of optical activity for some predetermined time duration, wherein determining whether there has been lack of optical activity for the predetermined time duration is performed after a predetermined time window after waking up the at least one communication unit; and
    in response to determining that there has been lack of optical activity for the predetermined time duration, placing the at least one communication unit into a low-power mode.

11. A method of controlling activation of one or more communication units in a survey system that performs surveying of a subterranean structure, comprising:
    detecting optical activity on at least one optical link connected to at least one communication unit that is part of the survey system for performing surveying of the subterranean structure;
    determining whether the optical activity has a characteristic that satisfies a predetermined criterion;
    in response to determining that the optical activity has the characteristic that satisfies the predetermined criterion, waking up the at least one communication unit;
    receiving a command to place the at least one communication unit into a low-power mode; and
    in response to receiving the command, placing the at least one communication unit into the low-power mode; and
    in response to the command, the at least one communication unit propagating a second command to immediate neighboring communication units to cause the immediate neighboring communication units to disable respective transmitters connected to optical links that interconnect the immediate neighboring communication units to the at least one communication unit.

12. The method of claim 11, wherein receiving the command comprises receiving the command containing a time at which the at least one communication unit is to be placed in the low-power mode.

13. A first communication unit for use in a survey system that performs surveying of a subterranean structure, comprising:
- a main processing core;
- an optical activity detector to:
  - detect optical activity on an optical link connected to the first communication unit that is part of the survey system for performing surveying of the subterranean structure,
  - in response to determining that the optical activity has a characteristic that satisfies a predetermined criterion, awaken the main processing core from a powered-off state to a powered-on state; and
- an optical transmitter that is to be awakened from a powered-off state to a powered-on state in response to the optical activity detector determining the optical activity having the characteristic that satisfies the predetermined criterion, wherein the optical transmitter being awakened causes the optical transmitter to transmit an optical activity to a second communication unit to awaken the second communication unit.

14. The first communication unit of claim 13, further comprising:
- a power supply that supplies at least two output voltages, wherein a first of the output voltages is connected to the optical activity detector; and
- a power switch to couple a second of the output voltages to a power supply voltage, wherein the power switch is initially in an open state to isolate the second output voltage from the power supply voltage, wherein the second power supply voltage is connected to the main processing core.

15. The first communication unit of claim 14, wherein the main processing core is powered off when the power switch is open, and wherein the main processing core is powered on when the power switch is closed.

16. The first communication unit of claim 14, further comprising at least one transceiver having the optical transmitter and an optical receiver, the optical transmitter connected to the second power supply voltage, and the optical receiver connected to the first output voltage.

17. The first communication unit of claim 14, wherein the optical activity detector is configured to close the power switch in response to determining that the optical activity has the characteristic that satisfies the predetermined criterion.

18. The first communication unit of claim 14, wherein the power supply is to receive power from a power source.

19. A survey system for performing a survey of a subterranean structure, comprising:
- a plurality of communication units to be coupled to an optical network, wherein at least one of the communication units includes:
  - an optical activity detector to:
    - detect optical activity in the optical network; and
    - in response to determining that the optical activity has a characteristic that satisfies a predetermined criterion, awaken the at least one communication unit, wherein determining that the optical activity has the characteristic that satisfies the predetermined criterion is performed without processing content of any message associated with the optical activity.

20. The survey system of claim 19, wherein the characteristic that satisfies the predetermined criterion comprises a time duration that is greater than a predetermined time value.

21. The survey system of claim 19, wherein the communication units contain corresponding real-time clocks, the real-time clocks of the communication units being synchronized with each other.

22. The survey system of claim 21, further comprising a controller to send a shutdown command to at least some of the communication units, wherein the shutdown command specifies a time at which the at least some communication units are to be placed into a low-power mode.

* * * * *